United States Patent [19]
Serravalle et al.

[11] Patent Number: 5,884,460
[45] Date of Patent: Mar. 23, 1999

[54] PROPANE POWERED LAWN EQUIPMENT

[76] Inventors: Robert P. Serravalle; Pietro Serravalle, both of 125 Park Ave., Hicksville, N.Y. 11801

[21] Appl. No.: 779,229

[22] Filed: Jan. 6, 1997

[51] Int. Cl.⁶ ................................................. A01D 34/00
[52] U.S. Cl. ................................. 56/1; 56/16.7; 56/229
[58] Field of Search .......................... 56/1, 2, 10.1, 12.2, 56/14.7, 16.7, 229, 233, 239, 249, 289

[56] References Cited

U.S. PATENT DOCUMENTS

| | | |
|---|---|---|
| 4,150,456 | 4/1979 | Alvarez et al. . |
| 4,327,553 | 5/1982 | Rilett . |
| 4,483,473 | 11/1984 | Wagdy . |
| 4,852,892 | 8/1989 | Reid . |
| 5,203,046 | 4/1993 | Shaw . |
| 5,581,986 | 12/1996 | Calver ................................ 56/17.5 X |
| 5,606,944 | 3/1997 | Kunihara ............................. 56/17.5 X |

*Primary Examiner*—Heather Shackelford
*Attorney, Agent, or Firm*—Michael I. Kroll

[57] ABSTRACT

A propane powered piece of lawn equipment (10) comprising an engine (12) on the piece of lawn equipment (10). A facility (14) is carried on the piece of lawn equipment (10), for holding non-pollutant propane gas. A component (16) is for delivering the non-pollutant propane gas from the holding facility (14) to the engine (12), to operate the engine (12) and run the piece of lawn equipment (10) for a cleaner atmospheric environment.

2 Claims, 5 Drawing Sheets

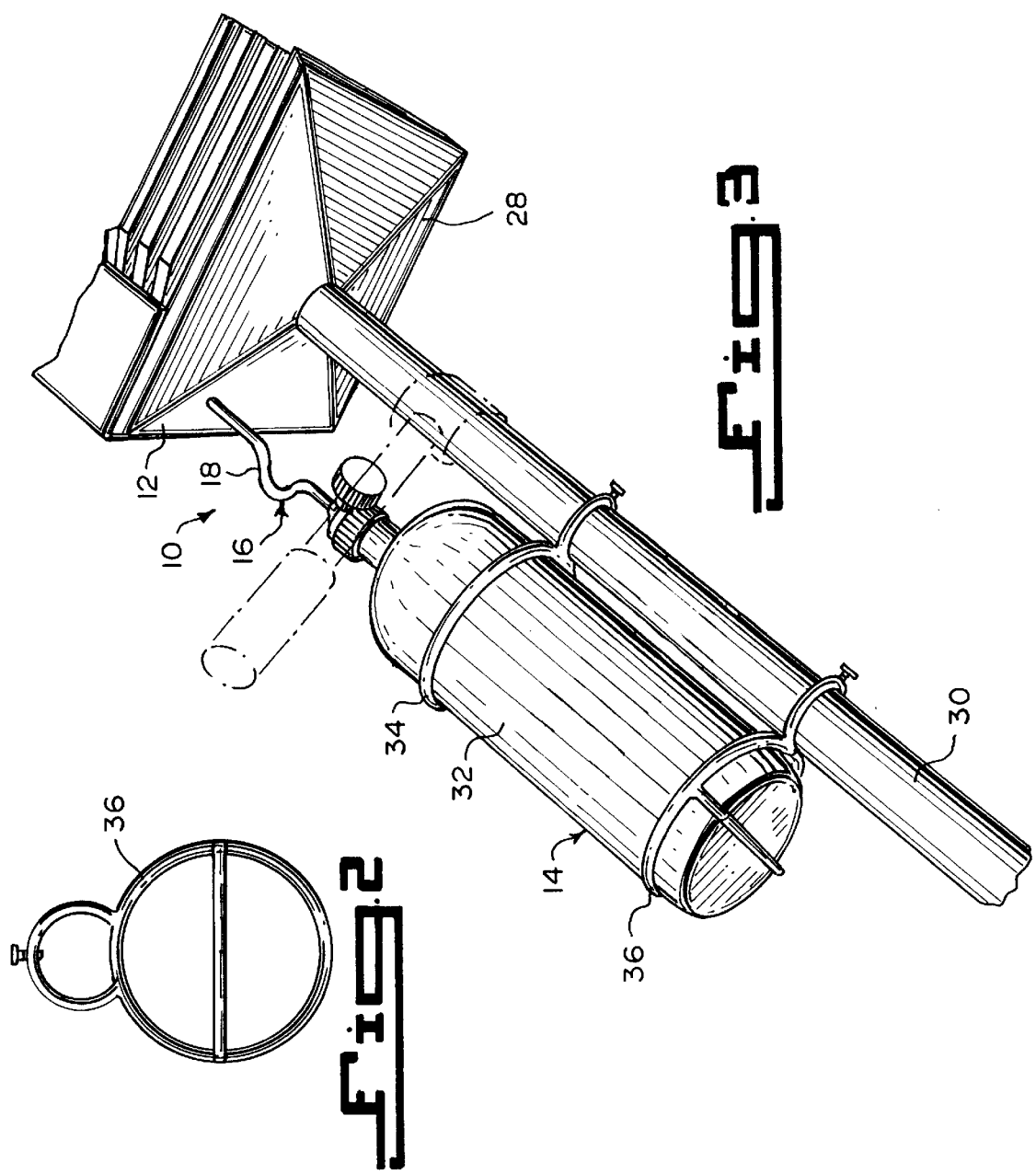

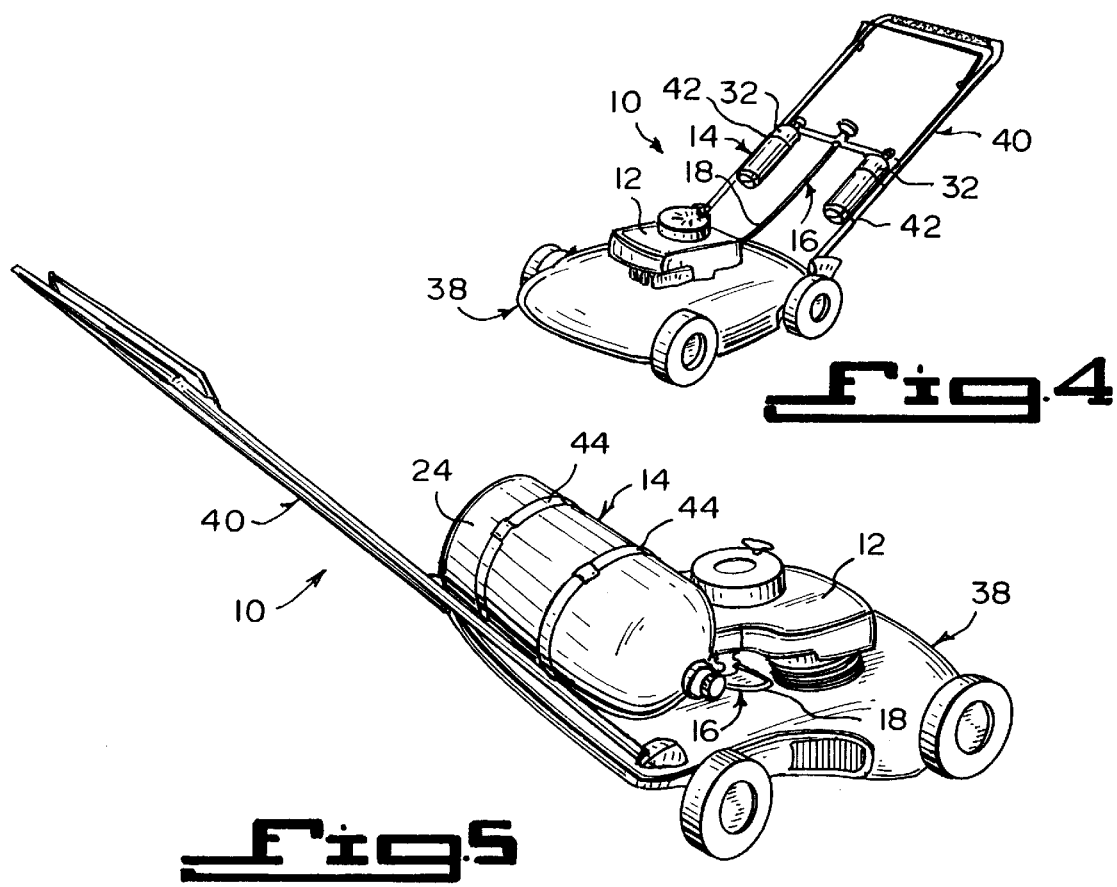

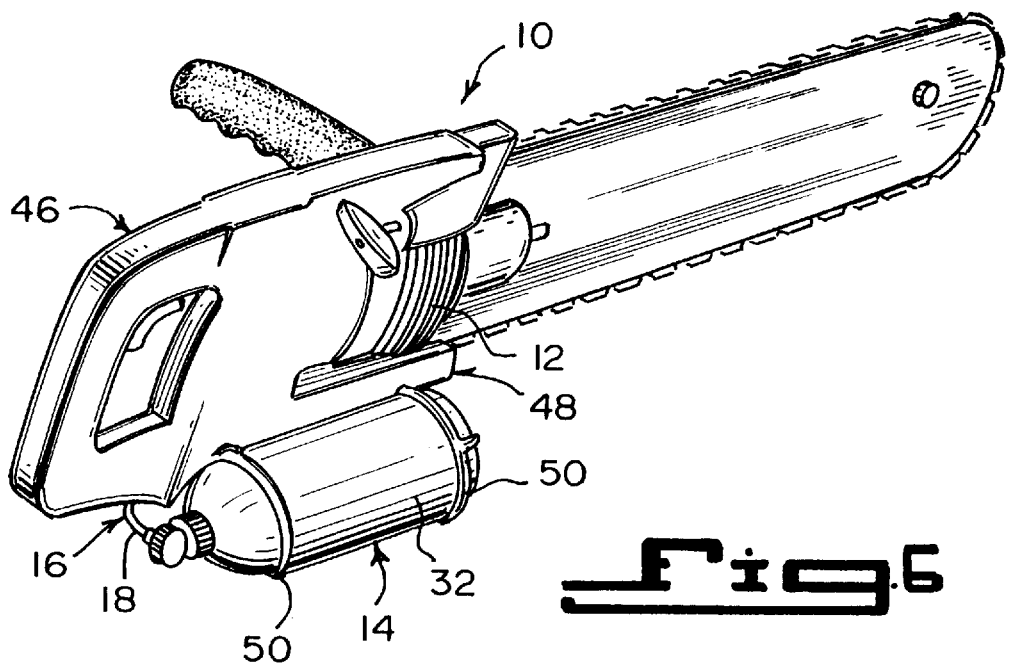
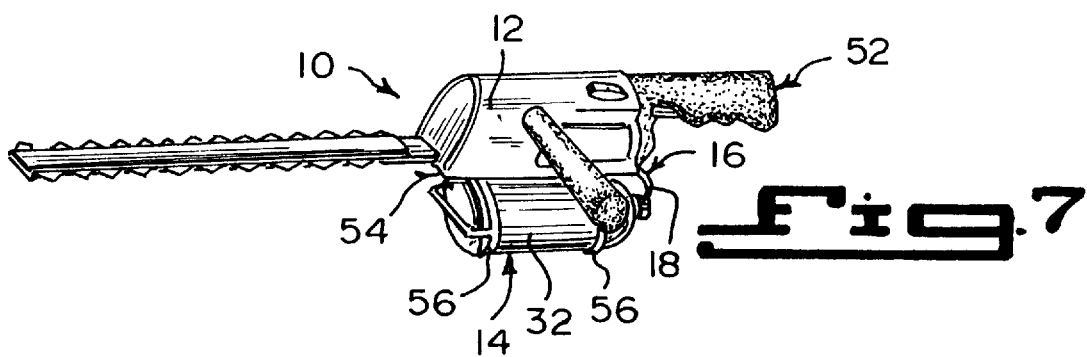

PROPANE POWERED LAWN EQUIPMENT

BACKGROUND OF THE INVENTION

1. Field of the Invention

The instant invention relates generally to gas operated machines and more specifically it relates to propane powered lawn equipment.

2. Description of the Prior Art

Numerous gas operated machines have been provided in prior art. For example, U.S. Pat. No. 4,150,456 to Alvarez et al.; 4,327,553 to Rilett; 4,483,473 to Wagdy and 5,203,046 to Shaw all are illustrative of such prior art. While these units may be suitable for the particular purpose to which they address, they would not be as suitable for the purposes of the present invention as heretofore described.

The Floor Scrubber and Buffer as described in U.S. Pat. No. 4,150,456 shows a floor scrubber provided with a propane powered internal combustion engine which is mounted on a wheeled dolly and which is attached by its rotary output shaft to a circular cage provided with a plurality of rotary brushes on the underside thereof. More specifically the output shaft from the internal combustion engine is connected through a pulley arrangement to the various rotary brushes and accordingly the case and the brushes are driven in counter-rotation. Included in the structure of the dolly is a spring loaded, telescoping support for deploying a serrated clean-out bar which by angular alignment can be placed under the path of advance of the pads in the cage, thus providing a cleaning function therefor. The internal combustion engine, furthermore, is contained in a noise reducing housing which furthermore is provided with a fan for cooling.

The Gas Power Motors in U.S. Pat. No. 4,327,553 shows a gas powered motor having a reservoir for liquefied gas, a supply passage from the reservoir leading through one side of a heat exchanger to the motor and a container holding a buffer substance in heat conductive relationship with the reservoir. The buffer substance acts to supply heat to the liquefied gas while undergoing a chemical, physical crystallographic or other change of state to assist in maintaining the supply of gas to the motor from the reservoir. The motor exhaust leads to a vessel containing a condensing buffer substance which absorbs, persorbs or otherwise associates with the gas accompanied by a release of heat. The condensing buffer substance is in heat conductive relation with the other side of the heat exchanger in the gas supply to the motor to superheat the gas supplied. The condensing buffer substance is capable of releasing the gas when subjected to reduced pressure by a pump provided which may be the gas motor run in reverse to extract the gas from the vessel and return it to the reservoir. In another embodiment the condensing buffer substance comprises an isothermal heat sink provided, for example, by a concentrated salt solution.

The Portable Gas-Powered Fastener Driving Tool in U.S. Pat. No. 4,483,473 shows a portable gas-fired fastener driving tool in which the tool cannot be operated until the combustion chamber is closed and the combustion chamber cannot be reopened after ignition until the trigger is released. The operation of the trigger is permitted by the actuation of a bottom trip mechanism which controls the movement of a sleeve mechanism that regulates the opening and closing of the combustion chamber. During the driving action, the combustion gases above the piston are evacuated through valved openings in the cylinder adjacent the bottom thereof. The piston contacts a bumper at the bottom of its travel and the difference between the vacuum in the combustion chamber and atmospheric air acts to return the piston to its driving position.

The Floor Buffing Machine in U.S. Pat. No. 5,203,046 shows a floor buffing machine powered by a propane engine which has a frusto-conical shield and an integral inverted channel extending rearwardly from the shield to provide a mounting deck for the engine and propane fuel tank. A buffing pad is rotated by the engine through a drive train and is carried on an inclined spindle having a flexible connection with the spindle. The incline of the spindle and the flexible construction of the connection causes the rearwardly moving side of the buffing pad to propel the machine forwardly.

SUMMARY OF THE INVENTION

A primary object of the present invention is to provide propane powered lawn equipment that will overcome the shortcomings of the prior art devices.

Another object is to provide propane powered lawn equipment in which a propane fuel tank is mounted in a removable manner to the equipment, so as to supply a non-pollutant propane gas to operate an engine and run the equipment for a cleaner atmospheric environment.

An additional object is to provide propane powered lawn equipment in which the propane fuel has a higher octane than gasoline, so that compression is raised for more power to operate the engine, wherein the engine will last longer and require less maintenance.

A further object is to provide propane powered lawn equipment that is simple and easy to use.

A still further object is to provide propane powered lawn equipment that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein;

FIG. 2 is an end view taken in the direction of arrow 2 in FIG. 1A of the bottom adjustable bracket.

FIG. 3 is an enlarged perspective view taken in the direction of arrow 3 in FIG. 1A with parts broken away and in phantom.

FIG. 4 is a perspective view of a third embodiment of the instant invention, being a power lawn mower with two small propane fuel tanks thereon.

FIG. 5 is a perspective view of a fourth embodiment of the instant invention, being a lawn mower with one large propane fuel tank thereon.

FIG. 6 is a perspective view of a fifth embodiment of the instant invention, being a power chain saw.

FIG. 7 is a perspective view of a sixth embodiment of the instant invention, being a power hedge trimmer.

Similar reference characters denote corresponding features consistently throughout the attached drawings.

DETAILED DESCRIPTION OF THE PREFERRED EMBODIMENTS

Figure 1:
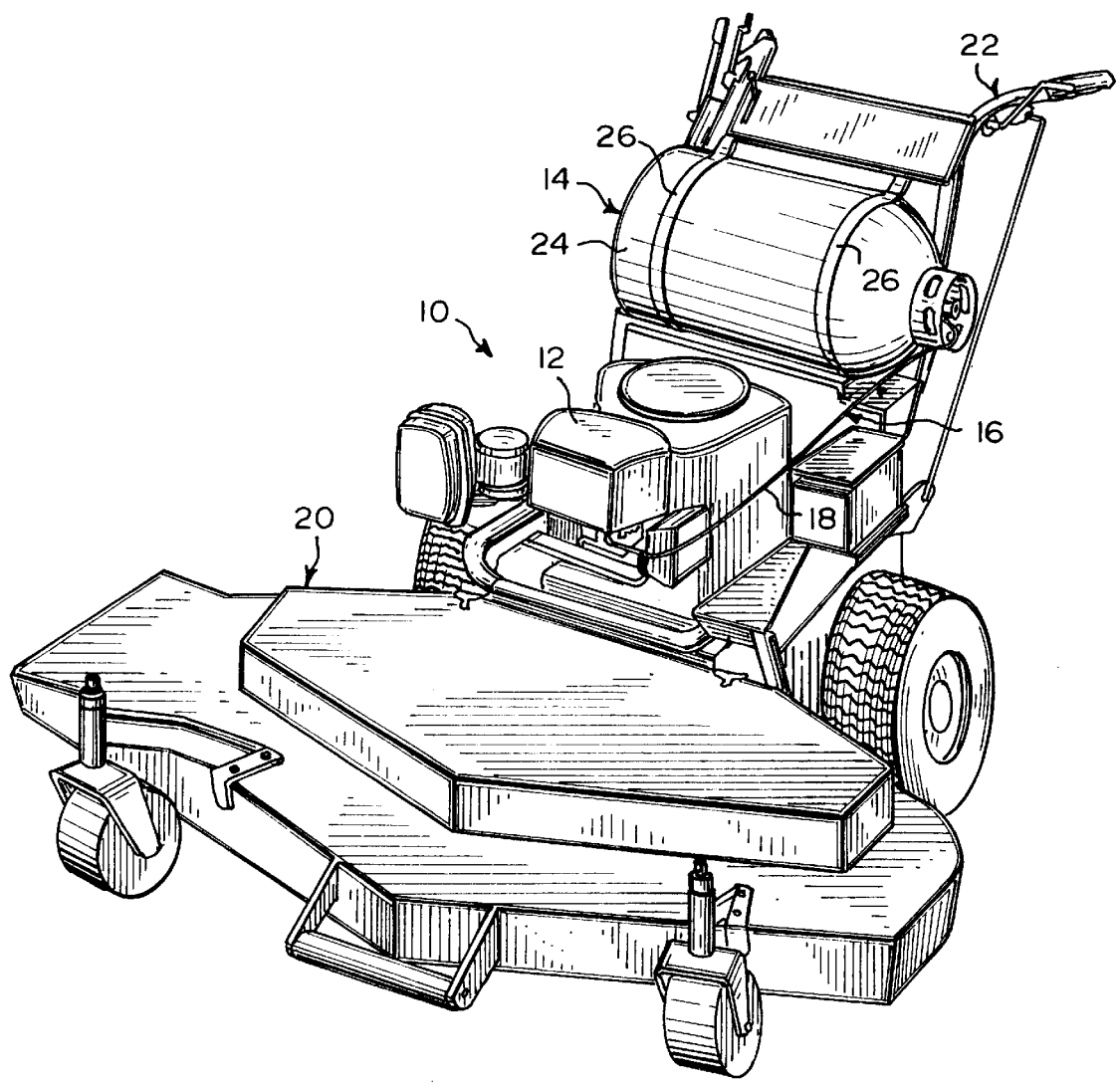
FIG. 1 is a perspective view of a first embodiment of the instant invention, being a walk-behind commercial lawn mower.

Turning now descriptively to the drawings, in which similar reference characters denote similar elements throughout the several views, FIGS. 1 through 7 illustrate a propane powered piece of lawn equipment 10 comprising an engine 12 on the piece of lawn equipment 10. A facility 14 is carried on the piece of lawn equipment 10, for holding non-pollutant propane gas. A component 16 is for delivering the non-pollutant propane gas from the holding facility 14 to the engine 12, to operate the engine 12 and run the piece of lawn equipment 10 for a cleaner atmospheric environment. The delivery component 16 is a flexible fuel line 18.

The piece of lawn equipment 10, as shown in FIG. 1, is a walk-behind commercial lawn mower 20 having a handlebar assembly 22. The holding facility 14, is a propane fuel tank 24 connected by two brackets 26 to the handlebar assembly 22 in a removable manner.

Figure 1A:
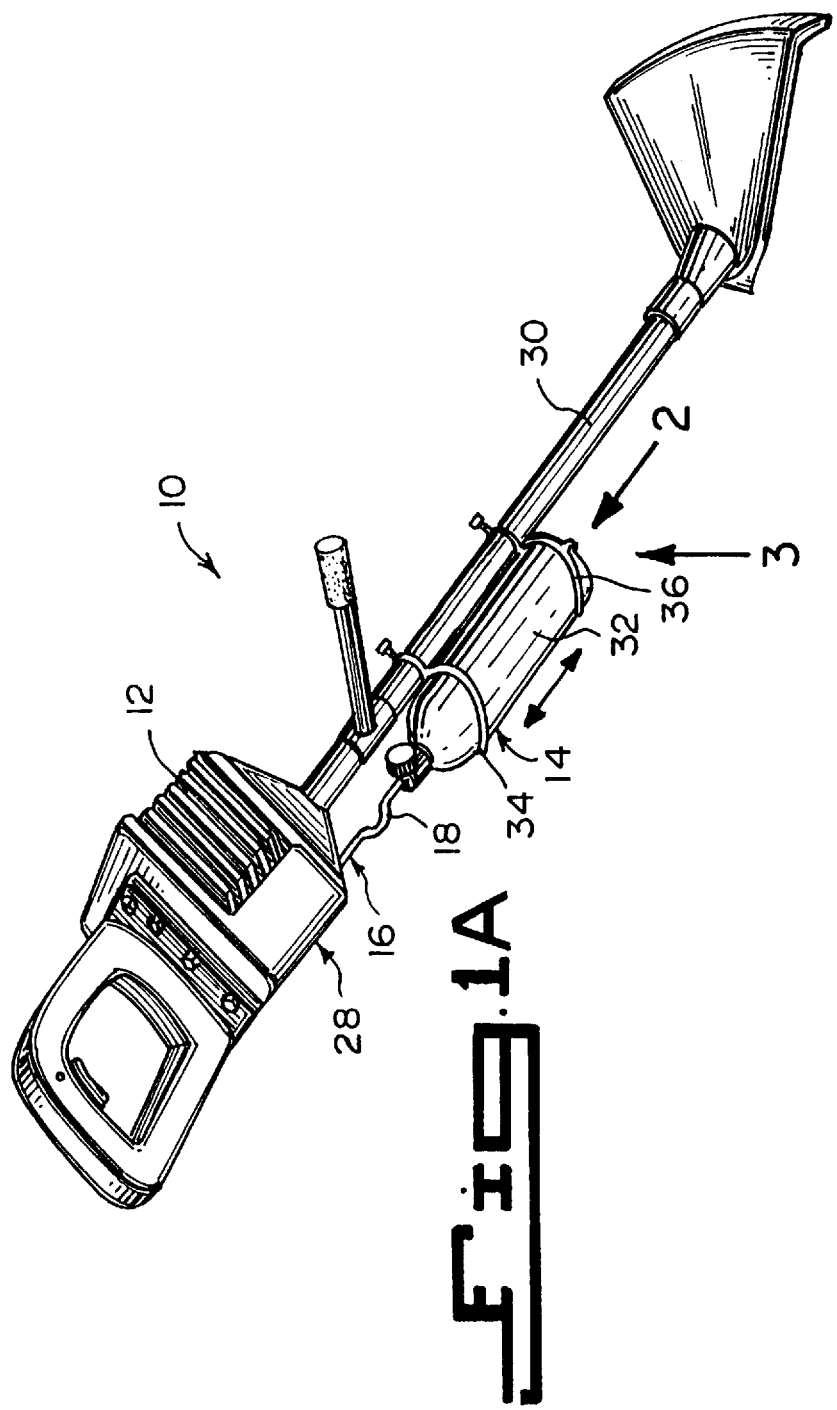
FIG. 1A is a perspective view of a second embodiment of the instant invention, being a power weed trimmer.

The piece of lawn equipment 10, as shown in FIGS. 1A and 3, is a power weed trimmer 28 having an elongated shaft 30. The holding facility 14 is a propane gas cylinder 32 connected by two adjustable brackets 34, 36 to the shaft 30 in a removable manner. The lower bracket 36 is best seen in FIG. 2.

The piece of lawn equipment 10, as shown in FIGS. 4 and 5, is a power lawn mower 38 having a handlebar assembly 40. In FIG. 4, the holding facility 14 includes two propane gas cylinders 32, each connected by a bracket 42 to the handlebar assembly 40 in a removable manner. In FIG. 5, the holding facility 14 is a propane fuel tank 24 connected by two brackets 44 to the handlebar assembly 40 in a removable manner.

In FIG. 6, the piece of lawn equipment 10 is a power chain saw 46 having a housing 48. the holding facility 14 is a propane gas cylinder 32 connected by two brackets 50 to the housing 48 in a removable manner.

In FIG. 7, the piece of lawn equipment 10 is a power hedge trimmer 52 having a housing 54. The holding facility 14 is a propane gas cylinder 32 connected by two brackets 56 to the housing 54 in a removable manner.

Other types of propane powered pieces of lawn equipment, not shown in the drawings, can be utilized in conjunction with the instant invention. For example, lawn edgers, portable grass cutter blowers, rider lawn mowers and other power operated tools can be used.

Operation of the Invention

To use the propane powered piece of lawn equipment 10, which is a walk-behind commercial lawn mower 20, as shown in FIG. 1, the following steps should be taken:

1. Connect the propane fuel tank 24 to the handlebar assembly 22 by the two brackets 26.
2. Attach the flexible fuel line 18 between the propane fuel tank 24 and the engine 12.
3. Operate the walk-behind commercial lawn mower 20 as you normally would.

To use the propane powered piece of lawn equipment 10, which is a power weed trimmer 28, as shown in FIGS. 1A, 2 and 3, the following steps should be taken:

1. Connect the propane gas cylinder 32 to the elongated shaft 30 by the two adjustable brackets 34, 36.
2. Attach the flexible fuel line 18 between the propane gas cylinder 32 and the engine 12.
3. Operate the power weed trimmer 28 as you normally would.

To use the propane powered piece of lawn equipment 10, which is a power lawn mower 38, as shown in FIG. 4, the following steps should be taken:

1. Connect the two propane gas cylinders 32 by their respective brackets 42 to the handlebar assembly 40.
2. Attach the flexible flue line 18 between the two propane gas cylinders 32 and the engine 12.
3. Operate the power lawn mower 38 as you normally would.

To use the propane powered piece of lawn equipment 10, which is a power lawn mower 38, as shown in FIG. 5, the following steps should be taken:

1. Connect the propane fuel tank 24 to the handlebar assembly 40 by the two brackets 44.
2. Attach the flexible fuel line 18 between the propane fuel tank 24 and the engine 12.
3. Operate the power lawn mower 38 as you normally would.

To use the propane powered piece of lawn equipment 10, which is a power chain saw 46, as shown in FIG. 6, the following steps should be taken:

1. Connect the propane gas cylinder 32 to the housing 48 by the two brackets 50.
2. Attach the flexible fuel line 18 between the propane gas cylinder 32 and the engine 12.
3. Operate the power chain saw 46 as you normally would.

To use the propane powered piece of lawn equipment 10, which is a power hedge trimmer 52, as shown in FIG. 7, the following steps should be taken:

1. Connect the propane gas cylinder 32 to the housing 54 by the two brackets 56.
2. Attach the flexible fuel line 18 between the propane gas cylinder 32 and the engine 12.
3. Operate the power hedge trimmer 52 as you normally would.

List of Reference Numbers 10 propane powered piece of lawn equipment
12 engine of 10
14 holding facility of 10
16 delivering component of 10
18 flexible fuel line for 16
20 walk-behind commercial lawn mower for 10
22 handlebar assembly of 20
24 propane fuel tank of 14
26 bracket of 14 for 24 on 22
28 power weed trimmer for 10
30 elongated shaft of 28
32 propane gas cylinder of 14
34 upper adjustable bracket of 14 for 32 on 30
36 lower adjustable bracket of 14 for 32 on 30
38 power lawn mower for 10
40 handlebar assembly of 38
42 bracket of 14 for 32 on 40 on 38
44 bracket of 14 for 24 on 40 on 38
46 power chain saw for 10
48 housing of 46

50 bracket of 14 for 32 on 46
52 power hedge trimmer for 10
54 housing of 52
56 bracket of 14 for 32 on 54

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A propane powered walk-behind commercial lawn mower comprising:
    a) said lawn mower having a handle bar assembly for controlling said lawn mower by a user walking behind said lawn mower and an internal combustion engine mounted on said lawn mower;
    b) means for holding non-pollutant propane gas comprising a tank of pressurized propane gas mounted on said handle bar assembly;
    c) means for delivering the non-pollutant propane gas from said propane tank to said engine comprising a flexible fuel line between said propane tank and said engine to operate said engine and run said lawn mower for a cleaner atmospheric environment; and
    d) wherein said handlebar assembly includes a pair of members extending upwardly terminating in a pair of handles, and a cross member extending between said members, and said propane fuel tank is placed longitudinally on said cross member and connected by two brackets to said cross member in a removable manner.

2. A propane powered walk-behind commercial lawn mower comprising:
    a) said lawn mower having a handle bar assembly for controlling said lawn mower by a user walking behind said lawn mower and an internal combustion engine mounted on said lawn mower;
    b) means for holding non-pollutant propane gas comprising a tank of pressurized propane gas mounted on said handle bar assembly;
    c) means for delivering the non-pollutant propane gas from said propane tank to said engine comprising a flexible fuel line between said propane tank and said engine to operate said engine and run said lawn mower for a cleaner atmospheric environment; and
    d) a second propane tank mounted on said handle bar assembly, said handle bar assembly including a pair of members extending upwardly and terminating in handles, both of said propane tanks being mounted in upright positions in parallel relationship to each other on opposite sides of said handlebar assembly along said upwardly extending members.

* * * * *